T. GOBLE.
CLAMP FOR POLISH RODS AND THE LIKE.
APPLICATION FILED FEB. 9, 1915.
1,177,771.
Patented Apr. 4, 1916.
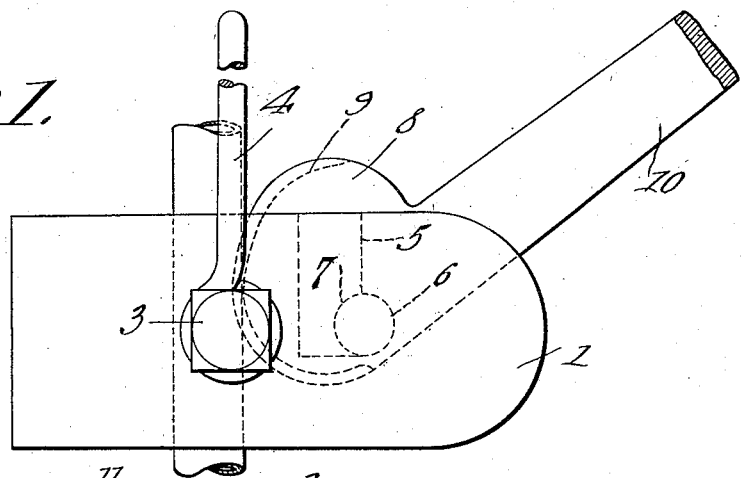
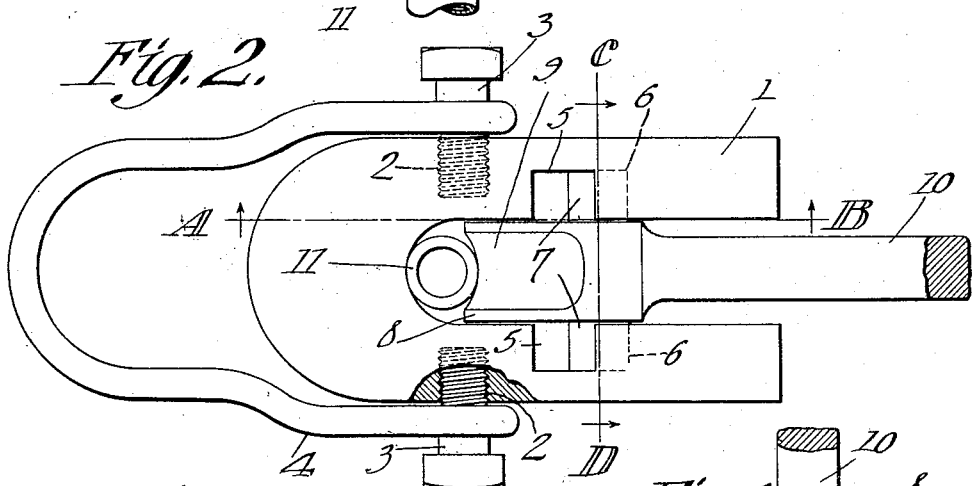
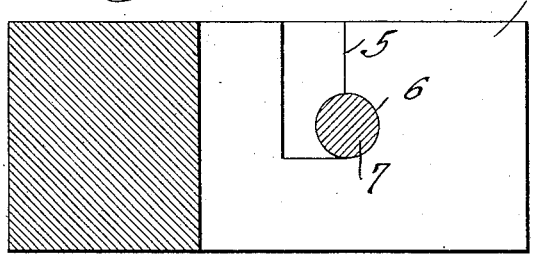
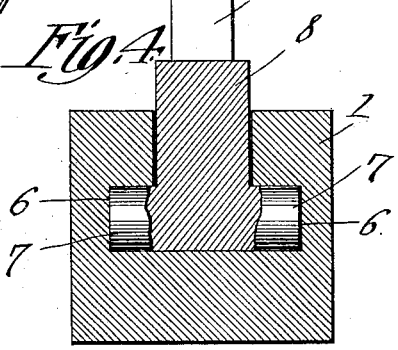
T. Goble
Inventor

UNITED STATES PATENT OFFICE.

TED GOBLE, OF MUSKOGEE, OKLAHOMA, ASSIGNOR TO CHARLES GOBLE, OF MUSKOGEE, OKLAHOMA.

CLAMP FOR POLISH-RODS AND THE LIKE.

1,177,771.

Specification of Letters Patent.

Patented Apr. 4, 1916.

Application filed February 9, 1915. Serial No. 7,154.

*To all whom it may concern:*

Be it known that I, TED GOBLE, a citizen of the United States, residing at Muskogee, in the county of Muskogee and State of Oklahoma, have invented a new and useful Clamp for Polish-Rods and the like, of which the following is a specification.

This invention relates to a clamp especially designed for use in engaging and supporting polish rods while repairs are being made to oil wells.

One of the objects of the invention is to provide a clamp made up of detachably connected members, one of which is adapted to be placed astride the rod to be held while the other member, when placed in operative position, will engage the rod and prevent it from slipping downwardly, the gripping action of the clamp upon the rod increasing in proportion to the weight suspended from the clamp.

A further object is to provide a clamp which is simple in construction and which can be readily placed in position upon a rod.

With the foregong and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of the clamp in position upon a rod. Fig. 2 is a plan view thereof, the bail being swung back for the purposes of illustration. Fig. 3 is a section on line A—B Fig. 2. Fig. 4 is a section on line C—D Fig. 2.

Referring to the figures by characters of reference 1 designates a yoke constituting the fixed member of the clamp, this yoke being provided in its sides with recesses 2 having threaded walls adapted to engage studs 3 extending laterally from the yoke, these studs alining. Said studs are pivotally engaged by the ends of a supporting bail 4. Each arm of the yoke 1 is provided within the inner side thereof with a groove 5 extending downwardly from the top of the arm to a point adjacent the center thereof, said groove being formed with an extension 6 at its lower end in that side of the groove nearest the free end of the arm of the yoke. The grooves 5 are designed to receive trunnions 7 extending from the sides of a cam 8, the active face of which is preferably grooved, as shown at 9 and this cam being provided with a handle 10 designed to work between the ends of the arms of the yoke. The cam is so formed and mounted that when the arm 10 is swung downwardly, the active face of the cam will move away from the inner or crown portion of the yoke, thus to release any object which may be in position within the yoke. However, by pushing the arm 10 upwardly, the cam is caused to swing inwardly against the object within the yoke, thus to bind said object against the intermediate or crown portion of the yoke, as shown in Figs. 1 and 2. Furthermore the weight of the object being gripped will tend to move the cam still farther in the same direction with the result that the gripping action exerted by the cam will increase in proportion to the weight of the object being supported. Whenever it is desired to release the object, it is merely necessary to pull downwardly on the handle 10.

In using the clamp for engaging and supporting a polish rod, the handle 10 is swung downwardly after which the cam 8 is pushed inwardly so as to remove its trunnions 7 from the extensions 6 of grooves 5. Said trunnions are then moved upwardly within the grooves until withdrawn from the yoke. The yoke is then placed astride the polish rod, as indicated generally at 11 after which the cam is replaced within the yoke by reversing the operation above described. The cam can then be rotated by pushing handle 10 upwardly so as to cause the rod to be gripped tightly between the intermediate or crown portion of the yoke and the cam. The bail 4 is adapted to be engaged by a cable or the like for supporting the polish rod while repairs are being made. It has been found, also, that the clamp herein described is especially useful to grip a rod line should the same break, and thus draw the parts together so that the said rod line can be repaired.

Importance is attached to the fact that the yoke can be readily slipped onto a rod simply by removing the cam therefrom and that the entire structure is formed of so few parts that there is no danger of the same getting out of order.

What is claimed is:—

A clamp including a yoke having grooves extending downwardly within the inner sides thereof, each groove having a forward extension at its lower end, a cam removably mounted within the yoke and having trunnions insertible downwardly within the grooves and forwardly into the extensions of the grooves, said cam having a handle movable upwardly to shift the cam to binding position, there being a groove extending longitudinally within the active face of the cam, studs extending laterally from the yoke close to the space between the cam and the inner end of the yoke, and a lifting bail straddling the yoke and pivotally engaging the studs.

In testimony that I claim the foregoing as my own, I have hereto affixed my signature in the presence of two witnesses.

TED GOBLE.

Witnesses:
E. PIDCOCK,
CHAS. GOBLE.

Copies of this patent may be obtained for five cents each, by addressing the "Commissioner of Patents, Washington, D. C."